July 29, 1969 K. Y. JABBAR 3,458,792
MOTOR CONTROL CIRCUIT
Filed Jan. 20, 1967
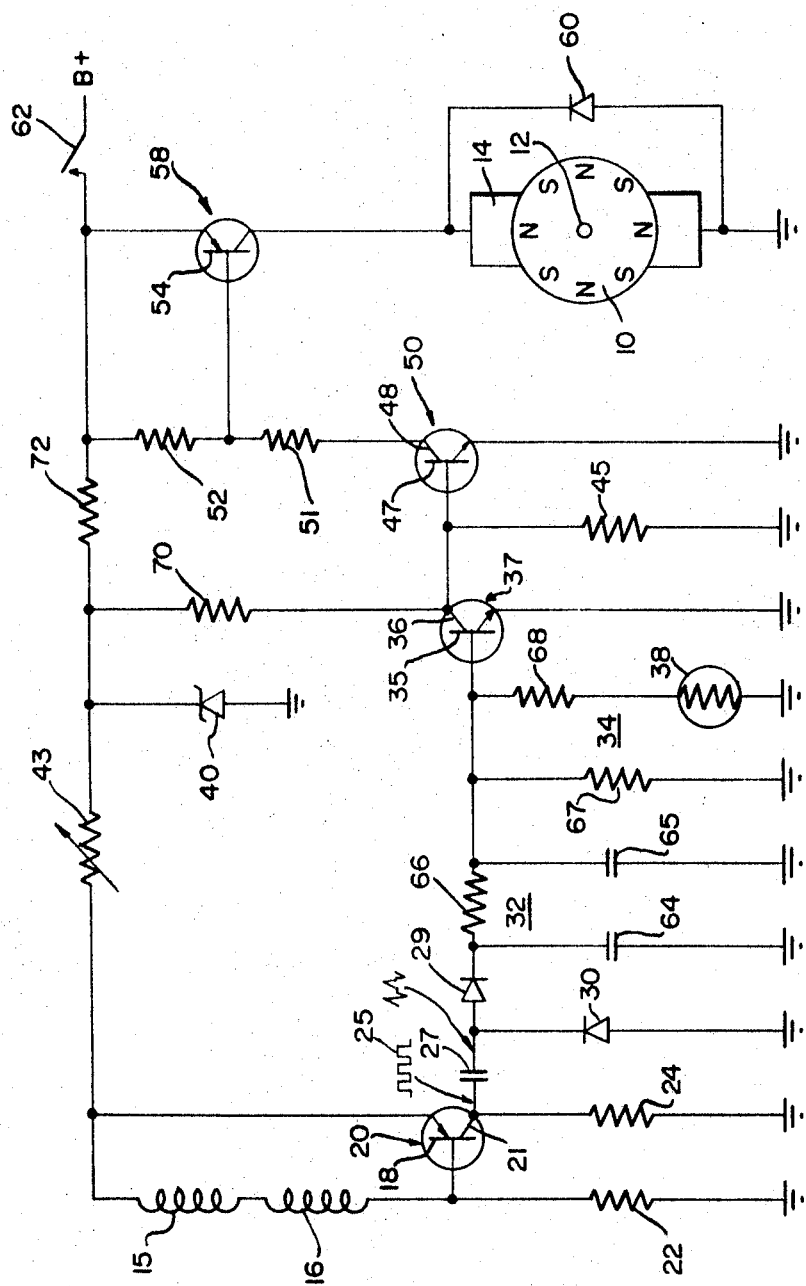
INVENTOR
KAMIL Y. JABBAR
BY Mueller, Aichele & Rauner
ATTORNEYS.

United States Patent Office 3,458,792
Patented July 29, 1969

3,458,792
MOTOR CONTROL CIRCUIT
Kamil Y. Jabbar, River Grove, Ill., assignor to Motorola, Inc., Franklin Park, Ill., a corporation of Illinois
Filed Jan. 20, 1967, Ser. No. 610,639
Int. Cl. H02p 5/00; H02k 27/20
U.S. Cl. 318—328       4 Claims

ABSTRACT OF THE DISCLOSURE

This circuit utilizes a magnet that rotates at the r.p.m. of the motor to induce an alternating current in a pickup coil having a frequency proportional to the motor r.p.m. The current is clipped by a transistor to form a square wave, differentiated and rectified to form a direct current control potential. The control potential operates a semiconductor output device through a transistor switch to control the motor r.p.m.

Background of the invention

This invention pertains to a control circuit for maintaining a preselected r.p.m. for an electric motor which is subjected to varying load and voltage conditions.

The majority of motor control circuits which have been developed to maintain a constant motor speed under varying load conditions generally use mechanical governors which include contacts and brushes. The mechanical governors are subject to wear and mechanical failure, and the brushes and contacts generate a certain amount of unwanted noise. In many instances, the speed setting of the motor is adjusted at the factory and there is little flexibility in adjusting the speed of the motor once it leaves there.

Summary of the invention

It is an object of this invention to provide a motor control circuit that eliminates the use of a mechanical governor thereby increasing the life span of the motor.

It is another object of this invention to provide a motor control circuit that permits in-the-field adjustments in speed settings.

In one embodiment of this invention, a semiconductor output device selectively couples a potential to an electric motor to drive the same at a controlled r.p.m. The system for controlling the r.p.m. includes a magnet that is coupled to the motor and rotated by it to induce an alternating current in a pickup coil at a frequency proportional to the motor r.p.m. The alternating current is clipped by a transistor to form a square wave. It is then differentiated, rectified and filtered into a direct current control potential. A semiconductor switch is coupled to the semiconductor output device and is responsive to the level of the direct current control potential to control the output of the semiconducor device thereby controlling the r.p.m. of the motor. A variable resistor is coupled to the input of the clipping transistor for varying the amplitude of the square wave output to select the r.p.m. at which the motor is to be controlled thereby providing a variable speed control for the motor.

The single figure of the drawing shows a schematic wiring diagram illustrating the motor control circuit in accordance with this invention.

Description of the preferred embodiment

Referring to the figure of the drawing, a disc magnet 10 is shown mounted to a shaft 12 of an electric motor 14. Two pickup coils 15 and 16 which are schematically shown in the drawing, are fixedly mounted in close proximity to the rotating magnet 10 within the motor housing. When the motor 14 is energized, the disc magnet 10 rotates at the same r.p.m. as the motor and thus induces an alternating current in the pickup coils 15 and 16 that has a frequency proportional to the motor r.p.m.

The induced alternating current is coupled to the base 18 of PNP transistor 20. The transistor 20 has a base bias resistor 22 and a current limiting resistor 24 connected to the collector 21. The transistor 20 conducts during the negative swings of the alternating current induced in coils 15 and 16 to clip the alternating current thereby developing a square wave output 25 on the collector 21. The square wave 25 is differentiated by capacitor 27 and diode 30 and clipped or rectified by diodes 29 and 30. The rectified direct current is filtered by a pi network 32 and coupled to the base 35 of NPN transistor 37. The parallel resistor network 34 which includes thermistor 38 provides temperature stability from —20° F. to +140° F. for the circuit.

The potentiometer 43 limits the amplitude of the square wave generated in the collector 21 of transistor 20. A Zener diode 40 insures a constant supply voltage to the potentiometer 43 and also to the transistor 37. The Zener diode 40 has a breakdown voltage which permits the circuit to operate under a wide range of supply voltages, for instance, at least between 10 to 15 volts.

The collector 36 of transistor 37 is coupled by a current limiting resistor 45 to the base 47 of NPN transistor 50. The collector 48 of transistor 50 is coupled through a voltage divider formed by resistors 51 and 52 to the base 54 of transistor 58. Transistor 58 is a power output transistor which, when it conducts, couples a current to the armature of motor 14 to energize the motor. Coupled across the motor 14 is a diode 60 which suppresses negative transients in the circuit and also protects transistor 58 from breakdown.

In operation, when the circuit is energized by closing switch 62, a potential is coupled by transistor 58 to the armature of the motor 14 to energize the motor. The rating of the transistor 58 is such that the motor will operate under various load conditions. As the motor speed builds up, the frequency of the alternating current induced in the pickup coils 15 and 16 increases. Depending upon the setting of the potentiometer 43, which controls the amplitude of the square wave 25, the motor will reach a speed at which the frequency of wave 25 at the preselected amplitude will provide a direct current control potential that is sufficient to bias on transistor 37. When transistor 37 conducts, the potential on the base 47 of transistor 50 is decreased to bias that transistor off. When transistor 50 is biased off, the potential on base 54 of transistor 58 rises to a point that transistor 58 is switched off to remove current from the armature of the motor 14 causing the motor to slow down. As the motor slows, the process is reversed. That is, if the motor slows below the set r.p.m., the frequency decreases which lowers the level of the generated direct current potential causing transistor 37 to be biased off. When transistor 37 stops conducting, the potential on the base 47 of transistor 50 increases to bias that transistor into conduction. When transistor 50 conducts, the potential on base 54 of transistor 58 is reduced, energizing that transistor thereby coupling a potential to the armature of motor 14 to energize the motor. The motor now speeds up until it exceeds the set speed at which time the process once again will be reversed. Transistor 37 therefore, cooperates with transistor 50 to form a semiconductor switching device responsive to the control potential to alternately switch on and off transistor 58 thereby switching on and off the motor to control its speed.

It can be seen that varying potentiometer 43 varies the amplitude of the generated square wave in effect establishing the desired r.p.m. of the motor. It is a simple matter, therefore, to adjust the r.p.m. of the motor by adjusting the potentiometer 43. Furthermore, the only moving mechanical part in the control is the rotating disk magnet 10 so that the system is free from mechanical wear and failure. In addition, the system is extremely accurate because it senses changes in motor frequency to effect control rather than sensing the amplitude of the generated potential. Sensing the amplitude is not as effective because temperature changes in the motor and the magnet 10 can induce error in the control voltage.

In one circuit which was constructed in accordance with the principles of this invention, the following values were used for the components. These values are shown here purely for illustrative purposes and are not meant to limit the invention in any manner.

| | |
|---|---|
| Pickup coils 15 and 16 | 1200 turns No. 40 wire used in conjunction with an 8 pole, 600 gauss magnet. |
| Transistor 20 | SM4544 (Motorola). |
| Transistor 37 | SM4542 (Motorola). |
| Transistor 50 | SM4542 (Motorola). |
| Transistor 58 | 2N176. |
| Diodes 29, 30, 60 | SR390 (Motorola). |
| Zener diode 40 | 1N4736A—6.8 volts. |
| Capacitor 27 | .39 microfarad. |
| Capacitor 64 | 20 microfarads. |
| Capacitor 65 | 10 microfarads. |
| Resistor 22 | 4.7K ohms. |
| Resistor 24 | 390 ohms. |
| Resistor 66 | 220 ohms. |
| Resistor 67 | 2.7K ohms. |
| Resistor 68 | 1.2K ohms. |
| Thermistor 38 | 5K ohms. |
| Resistor 70 | 3.9K ohms. |
| Resistor 45 | 680 ohms. |
| Resistor 51 | 180 ohms. |
| Resistor 52 | 47 ohms. |
| Resistor 72 | 100 ohms. |
| Potentiometer 43 | 68–560 ohms. |

What has been described, therefore, is an improved motor control circuit that eliminates mechanical governors and permits simple in-the-field adjustments in the setting of the desired motor r.p.m.

I claim:

1. A motor control circuit including in combination, generating means for developing an alternating current proportional to the r.p.m. of the motor, pulse producing means coupled to said generating means and being responsive to the frequency of the generated current for developing a substantially square wave output, variable resistor means coupled to said pulse producing means for limiting the amplitude of said square wave for establishing the desired r.p.m. of the motor, circuit means coupled to said pulse producing means for developing a direct current control potential from said square wave the level of which depends on the frequency of the generated alternating current with the amplitude of said square wave being limited by said variable resistor means, semiconductor output means coupled to the motor for applying a potential thereto, and means coupled between said circuit means and said semiconductor output means and being responsive to the control potential to control said output means to vary the potential coupled to the motor thereby regulating the r.p.m. of the motor to that determined by said variable resistor means.

2. The motor control circuit of claim 1 wherein said pulse producing means is semiconductor means, said semiconductor means conducting only during a portion of the swing of the generated alternating current to form a square wave having a frequency proportional to the frequency of the generated current.

3. The motor control circuit of claim 1 wherein said means coupled between said circuit means and said semiconductor means includes first and second transistors of similar types having input and output electrodes, said direct current control potential being coupled to the input electrode of one transistor, said one transistor having said output thereof coupled to said input of the other transistor, and said output of said other transistor being coupled to said semiconductor output means so that conduction of said one transistor in response to said control potential reduces conduction in said other transistor thereby controlling conduction of said semiconductor output means.

4. A motor control circuit including in combination, generating means for developing an alternating current proportional to the r.p.m. of the motor, signal translating means coupled to said generating means and being responsive to the frequency of the generating current for developing an alternating control potential, variable resistor means coupled to said signal translating means for limiting the amplitude of said alternating control potential to determine the desired r.p.m. of the motor, circuit means coupled to said signal translating means for developing a direct current potential from said alternating potential, said circuit means including differentiating means coupled to said signal translating means, rectifying means coupled to said differentiating means, filter means coupled to said rectifying means, and means for temperature compensating said circuit means coupled to said filter means, semiconductor output means coupled to the motor for applying a potential thereto, and means coupled between said circuit means and said semiconductor output means responsive to the control potential to control said output means to vary the potential coupled to the motor thereby regulating the r.p.m. of the motor to that determined by the variable resistor means.

References Cited

UNITED STATES PATENTS

| 3,064,175 | 11/1962 | Vergez | 318—341 |
| 3,368,134 | 2/1968 | Mead | 318—341 XR |

ORIS L. RADER, Primary Examiner

ROBERT J. HICKEY, Assistant Examiner

U.S. Cl. X.R.

318—341